United States Patent
Coombes et al.

(10) Patent No.: US 10,841,201 B2
(45) Date of Patent: Nov. 17, 2020

(54) SYSTEM AND METHOD FOR MANAGING AND CONTROLLING A DYNAMIC TUNNELING PROTOCOL IN A MESH NETWORK

(71) Applicant: Gooee Limited, St Albans (GB)

(72) Inventors: Simon Coombes, St Petersburg, FL (US); Shmuel Silverman, Novato, CA (US)

(73) Assignee: Gooee Limited, St Albans (GB)

( * ) Notice: Subject to any disclaimer, the term of this patent is extended or adjusted under 35 U.S.C. 154(b) by 0 days.

(21) Appl. No.: 16/369,756

(22) Filed: Mar. 29, 2019

(65) Prior Publication Data

US 2019/0245776 A1 Aug. 8, 2019

Related U.S. Application Data

(63) Continuation-in-part of application No. 16/264,915, filed on Feb. 1, 2019.

(60) Provisional application No. 62/627,215, filed on Feb. 7, 2018, provisional application No. 62/649,868, filed on Mar. 29, 2018.

(51) Int. Cl.
*H04L 12/729* (2013.01)
*H04L 12/721* (2013.01)
*H04L 12/859* (2013.01)

(52) U.S. Cl.
CPC ............ *H04L 45/125* (2013.01); *H04L 45/44* (2013.01)

(58) Field of Classification Search
CPC ..... H04L 45/125; H04L 45/44; H04L 45/741; H04L 47/825; H04L 12/4633; H04L 45/38; H04L 45/16
See application file for complete search history.

(56) References Cited

U.S. PATENT DOCUMENTS

| 8,085,792 | B1 | 12/2011 | Aly | |
|---|---|---|---|---|
| 8,160,096 | B1 * | 4/2012 | Anburaj | H04J 3/1605 370/255 |
| 9,398,568 | B2 | 7/2016 | Görgen et al. | |
| 9,473,393 | B2 | 10/2016 | Van Der Stok | |
| 9,565,065 | B2 | 2/2017 | Kelsey | |

(Continued)

OTHER PUBLICATIONS

U.S. Appl. No. 16/264,915, filed Feb. 1, 2019.
U.S. Appl. No. 16/369,826, filed Mar. 29, 2019.

*Primary Examiner* — Ajit Patel
*Assistant Examiner* — Wilfred Thomas
(74) *Attorney, Agent, or Firm* — McBee Moore & Vanik IP, LLC

(57) ABSTRACT

According to some embodiments, a system and method for managing dynamic tunneling in in a mesh network is disclosed. The method comprises associating an application that transmits high density data packets with a first of a plurality of nodes in a mesh network. The first of the plurality of nodes functions as an originator station for transmitting the high-density data packets to a second of the plurality of nodes in the mesh network that functions as a target station. An auto-trigger to be initiated by the application in a case that the application requires more bandwidth is created. In response to the auto-trigger being activated, a message is generated across the plurality of nodes to activate a best path through the mesh network where the message indicates a time duration that the application will require more bandwidth.

16 Claims, 8 Drawing Sheets

(56) References Cited

U.S. PATENT DOCUMENTS

| | | | |
|---|---|---|---|
| 2007/0161352 A1 | 7/2007 | Dobrowski et al. | |
| 2007/0214280 A1* | 9/2007 | Patel | H04L 45/04 |
| | | | 709/239 |
| 2008/0170550 A1* | 7/2008 | Liu | H04L 49/602 |
| | | | 370/338 |
| 2009/0268677 A1* | 10/2009 | Chou | H04L 45/125 |
| | | | 370/329 |
| 2011/0210816 A1* | 9/2011 | Wang | H04L 63/0428 |
| | | | 340/3.71 |
| 2014/0112126 A1* | 4/2014 | Claessens | H04L 45/54 |
| | | | 370/229 |
| 2015/0207749 A1* | 7/2015 | Cao | G06F 16/24568 |
| | | | 709/226 |
| 2016/0007185 A1* | 1/2016 | Zhu | H04W 8/06 |
| | | | 455/435.1 |
| 2018/0091407 A1* | 3/2018 | Tervonen | H04L 43/0852 |
| 2018/0131599 A1 | 5/2018 | Dimitriadis et al. | |
| 2018/0152406 A1* | 5/2018 | Kuo | H04L 51/18 |
| 2018/0220283 A1 | 8/2018 | Condeixa et al. | |
| 2018/0376317 A1 | 12/2018 | Kim | |

\* cited by examiner

210

**Fully Connected Mesh Network

220

**Partially Connected Mesh Network

700

```
┌─────────────────────────────────────────────────────────────────┐
│ Manage Multiple Applications And Profiles To Send/Receive Data │
│ Packets Of High Bandwidth Application Via Dynamic Tunnel        │ 710
│ Network Protocol In A Mesh Network From A Originator Station    │
│ To A Target Station                                             │
└─────────────────────────────────────────────────────────────────┘
                              │
                              ▼
┌─────────────────────────────────────────────────────────────────┐
│ Provide An Interface To Identify A High Density Data Packets    │ 720
│ Originated from The Originator Station And Location Of Its      │
│ Connected Nodes                                                 │
└─────────────────────────────────────────────────────────────────┘
                              │
                              ▼
┌─────────────────────────────────────────────────────────────────┐
│ Implement Automatic Discovery Of The High Bandwidth Application │ 730
│ And Connected Source/Root Node of Said Application              │
└─────────────────────────────────────────────────────────────────┘
                              │
                              ▼
┌─────────────────────────────────────────────────────────────────┐
│ Setting An Auto-Trigger Driven By Said Application That Is in   │ 740
│ Requirement Of More Bandwidth To Transfer High Density Data     │
│ Packets                                                         │
└─────────────────────────────────────────────────────────────────┘
                              │
                              ▼
                             (A)
```

FIG. 7A

SYSTEM AND METHOD FOR MANAGING AND CONTROLLING A DYNAMIC TUNNELING PROTOCOL IN A MESH NETWORK

CROSS-REFERENCE TO RELATED APPLICATIONS

This application is a continuation-in-part of and claims priority to U.S. patent application Ser. No. 16/264,915 filed Feb. 1, 2019, which claims the benefit of U.S. Provisional Patent Application No. 62/627,215 filed Feb. 7, 2018. This application claims the benefit of U.S. Provisional Patent Application No. 62/649,868 filed Mar. 29, 2018. The entire contents of each of the applications listed above are incorporated herein by reference.

BACKGROUND

In communication networks, a node may include a redistribution point (e.g. data communication equipment) or a communication endpoint (e.g. data terminal equipment). A mesh network is a local network topology in which infrastructure nodes (i.e. bridges, switches and other infrastructure devices) connect directly, dynamically and non-hierarchically to as many other nodes as possible and cooperate with one another to efficiently route data from/to clients. In a fully connected mesh network, such as network 210 illustrated in FIG. 2A, every node may be interconnected. The simplest fully connected network is a two-node network. In a partially connected network, such as network 220 illustrated in FIG. 2B, certain nodes may be connected to exactly one other node while other nodes are connected to two or more other nodes via a point-to-point link. This may make it possible to make use of some of the redundancy of mesh topology that is physically fully connected, without the expense and complexity required for a connection between every node in the network. Mesh networks are growing in size as industrial, lighting, smart home and other Internet of Things (IoT) applications are taking advantage of them with multitudes of sensors and other devices.

BLUETOOTH mesh networks are one such network type. These networks make use of messages called heartbeats that are transmitted by nodes periodically. A heartbeat message may indicate to other nodes in the network that the node sending the heartbeat is still active. In addition, heartbeat messages may contain data which may allow receiving nodes to determine how far away a sender is in terms of a number of hops required to reach the sender. The use of heartbeat messages may be associated with a time to live (TTL) field within a network packet. TTL may control a maximum number of hops over which a message will be relayed. Setting the TTL may allow nodes to exercise control over relaying and conserve energy, by ensuring messages are not relayed further than is required. Furthermore, each node may implement a cache that contains all recently seen messages and if a message is found to be in the cache this is an indication that the node has seen and processed the message.

Deploying large density mesh networks inevitably leads to an increase in interference, as sensor nodes and other nodes are constantly sending messages across the network. In large density mesh networks, data packets may travel through and hop across many intermediate nodes. For example, data may have to hop more than ten or more nodes to reach a destination. For every hop in the mesh network, a transfer speed of a data packet transfer may be significantly lessened. If the data packet originated from a high bandwidth application or originator station, a transmission time to reach the target station may be severely diminished. Applications may need higher bandwidth for short periods of time but with varying frequency of occurrence. For example, when sending video data, which requires a high frame rate, a mesh network by its very nature may make it difficult to prioritize messages getting through the network due to the competing messages broadcasting through the network. Furthermore, as mesh networks grow in size and are deployed in a relatively close space, there is a substantial increase in a likelihood that interference or collisions will result in message communication failure.

Accordingly, there exists a need for a system and method of implementing a protocol in a mesh network to facilitate high speed transmission of a message through the network for avoiding interference and collisions that are common in such prior art networks.

BRIEF DESCRIPTION

In some embodiments, a system for managing dynamic tunneling in a mesh network is disclosed. The exemplary system comprises: a first of a plurality of nodes in a mesh network to function as an originator station, where the first of the plurality of nodes is associated with an application that transmits high-density data packets; a second of the plurality of nodes in the mesh network to function as a target station and to receive the high-density data packets from the application; and a third of the plurality of nodes in the mesh network to function as a coordinating node and to generate a message, via a processor, across the plurality of nodes to activate a best path through the mesh network when the application requires more bandwidth.

In an aspect, a method for managing dynamic tunneling in a mesh network is disclosed. The exemplary method comprises: associating an application that transmits high density data packets with a first of a plurality of nodes in a mesh network that functions as an originator station for transmitting the high density data packets to a second of the plurality of nodes in the mesh network that functions as a target station; creating an auto-trigger to be initiated by the application in a case that the application requires more bandwidth; and in response to the auto-trigger being activated, generating a message, via a processor, across the plurality of nodes to activate a best path through the mesh network.

In another aspect, a non-transitory computer readable medium, comprising computer executable steps that, when executed by a processor, perform a method for managing dynamic tunneling in a mesh network is disclosed. The exemplary method executed by the medium comprises: associating an application that transmits high density data packets with a first of a plurality of nodes in a mesh network that functions as an originator station for transmitting the high density data packets to a second of the plurality of nodes in the mesh network that functions as a target station; creating an auto-trigger to be initiated by the application in a case that the application requires more bandwidth; and in response to the auto-trigger being activated, generating a message, via a processor, across the plurality of nodes to activate a best path through the mesh network, wherein the message indicates a time duration that the application will require more bandwidth.

BRIEF DESCRIPTION OF THE DRAWINGS

The above and still further features and advantages of exemplary embodiments of the present disclosure will become apparent upon consideration of the following detailed description of embodiments thereof, especially when taken in conjunction with the accompanying drawings, and wherein:

FIG. 7A and FIG. 7B illustrate a method according to some embodiments.

Figure 1:
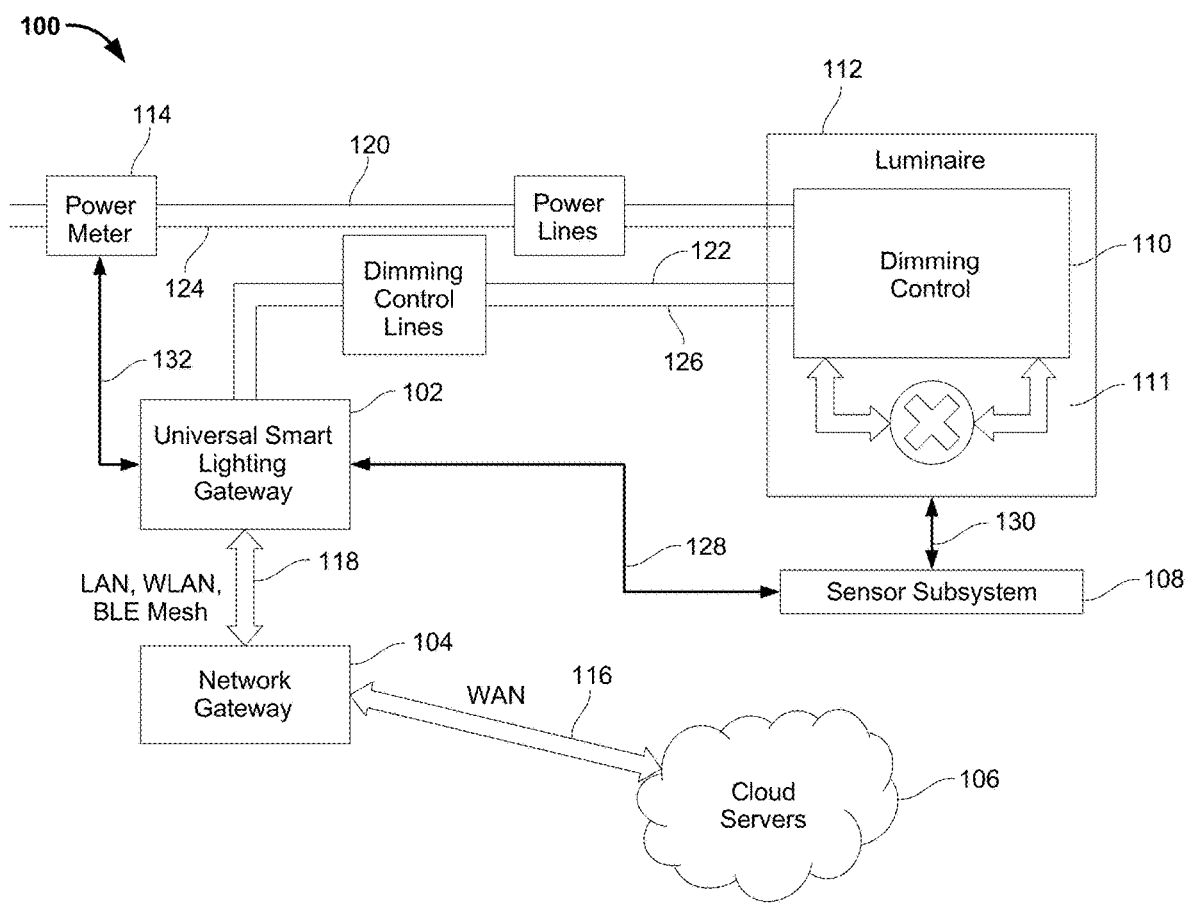
FIG. 1 illustrates a high-level system diagram of a luminaire IoT network which may be implemented in any wired or wireless or light communication mesh network system according to some embodiments.
Figure 2A:
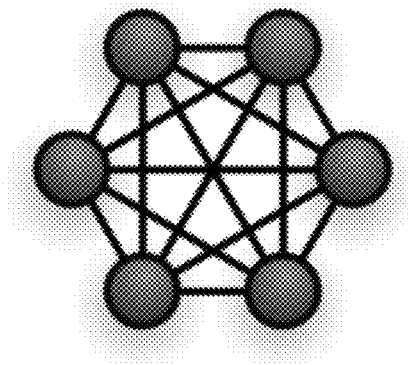
FIG. 2A and FIG. 2B illustrate a logical topology diagram of a fully and partially connected mesh network according to the prior art which may be implemented in any wired or wireless or light communication network system.
Figure 2B:
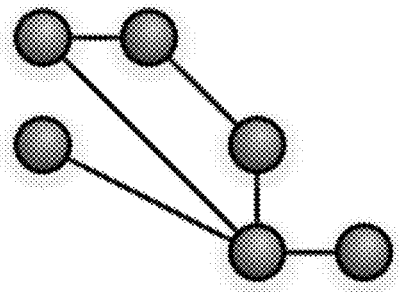

Various features, aspects, and advantages of the exemplary embodiments will become more apparent from the following detailed description, along with the accompanying figures in which like numerals represent like components throughout the figures and text. The various described features are not necessarily drawn to scale, but are drawn to emphasize specific features relevant to some embodiments.

The headings used herein are for organizational purposes only and are not meant to be used to limit the scope of the description or the claims. To facilitate understanding, reference numerals have been used, where possible, to designate like elements common to the figures.

DETAILED DESCRIPTION

Embodiments described herein relate generally to devices, systems, and methods for managing and controlling a dynamic tunneling protocol in a mesh network. For purposes of this disclosure, the phrases "devices," "systems," and "methods" may be used either individually or in any combination referring without limitation to disclosed components, grouping, arrangements, steps, functions, or processes. The exemplary disclosed devices, systems, and methods may provide for an interface to set up identification of an application that may require more bandwidth for high-density data packets. The setup information may store a location of a node associated with the application such as, but not limited to, an originator station. In some embodiments, the setup identification may be related to an automatic discovery and/or an auto-trigger setup for the application. Furthermore, controlling the dynamic tunneling protocol may be based on sending a start message to initiate the dynamic tunneling protocol and sending a close message to stop the dynamic tunneling protocol and to restart normal operation of the mesh network. The mesh network described herein may include any type of wired or wireless network or light communication network system. More particularly, the present embodiments relate to a system and method for implementing or initiating an interference mitigating protocol in a mesh network. Exemplary embodiments described herein will be illustrated below in conjunction with a mesh network incorporated in the luminaire IoT network system. However, the embodiments of the system and method may be implemented in any type of wired or wireless or light communication, e.g., a Visual Light Communication/Dark Light Communication (VLC/DLC) network system.

The term "module" as used herein may refer to any known or later developed hardware, software, firmware, artificial intelligence, fuzzy logic, or combination of hardware and software that is capable of performing the functionality associated with that element. Also, while the present disclosure may be described in terms of exemplary embodiments, it should be appreciated those individual aspects of the embodiments described herein may be separately claimed.

The term "computer-readable medium" as used herein refers to any tangible storage and/or transmission medium that participate in storing and/or providing instructions to a processor for execution. Such a medium may take many forms, including but not limited to nonvolatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other non-transitory medium, magneto optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to email or other self-contained information archive or set of archives may be considered a distribution medium equivalent to a tangible storage medium. When the computer-readable media is configured as a database, it may be understood that the database may be any type of database, such as relational, hierarchical, object-oriented, and/or the like. Further, while reference is made to various types of databases, it may be understood by one of ordinary skill in the art that all of the database functions may be stored within compartments of a single database, or within individual databases. In any event, the present specification may be considered to include a tangible storage medium or distribution medium and prior art-recognized equivalents and successor media, in which the software implementations of the present disclosure are stored.

Now referring to FIG. 1, an exemplary system 100 that may relate to control of a luminaire driver and/or LED driver behavior by using a single variable in an IoT system is shown. In some embodiments, the system may include at least one of a plurality of luminaires 112 and/or a plurality of LEDs 111 configured to communicate with at least one gateway 102, at least one single variable to control the luminaire driver and/or LED driver behavior, at least one sensor subsystem 108 configured to sense a plurality of color channels and monitor at least one change in environment in real time, at least one power meter 114 configured to measure power consumption of one or more luminaires 112 in real time, at least one dimming control protocol or dimming controller device or driver or interface 110 installed in one or more lighting devices (e.g., luminaires 112) and for controlling a plurality of dimming levels and/or dimming protocols of the lighting devices, and at least one server 106 (e.g. a cloud based server). For purposes of this disclosure, "environment" means generally and without limitation a space or area in which a luminaire or lighting system is installed. For purposes of this disclosure, "real time" generally means substantial concurrency without any particular timeframe or limitation.

In the exemplary embodiment shown in FIG. 1, the server 106 is a cloud server 106. In the same or other embodiments, one or more servers 106 may be a local server, dedicated server, processor, or other unit consistent with this disclosure. Each of the plurality of luminaires 112 and/or LEDs 111 may include at least one driver and/or LED driver. Further, each of the plurality of luminaires 112 and/or LEDs 111 may comprise an inbuilt power source where the power source may include at least one of plurality of rechargeable batteries. The at least one sensor subsystem 108 and the at least one power meter 114 may be connected with the at least one gateway 102 along with the plurality of luminaires 112. The at least one sensor subsystem 108 may include at least two sensors. A first sensor may include an environment sensor dedicated to environment sensing and may be arranged such that it faces away from and/or extends in a downwardly fashion from the luminaire. A second sensor may include a color sensor such as, without limitation, a Red Green Blue (RGB) or Yellow Red Green Blue (YRGB) sensor arranged such that it faces the luminaire directly. According to certain exemplary disclosed embodiments, the at least one server 106 is configured to calculate and predict depreciation of the dimming levels of the luminaires 112 and/or LEDs 111. The sensor subsystem 108 may be configured to report and change display status information associated with the luminaires 112. The at least one sensor subsystem 108 may also sense and capture environmental data in real time. In some embodiments, the at least one server 106 may be connected with the gateway 102 via at least one of a wired connection and a wireless or light communication network connection.

In some embodiments, the gateway 102 may be capable of discovering a dimming control protocol installed in the luminaire 112 and controlling at least one of the dimming levels and dimming control protocol of the luminaire 112. Further, the gateway 102 may be capable of controlling power to the luminaire 112 and may be capable of dimming the luminaire 112 to a minimal level or shutting it off completely. According to some embodiments, the at least one server 106 may be configured to calculate and predict depreciation of the dimming levels of the luminaires 112 and/or LEDs 111. Each sensor and/or sensor subsystem 108 may be configured to report and change display status information associated with at least one luminaire 112. The at least one sensor subsystem 108 and the at least one power meter 114 may each be connected with the at least one gateway 102. The at least one of the plurality of luminaires 112 and the plurality of LED's 111 may be physically connected to the gateway 102 via at least one dimming control interface 110.

In some embodiments, the luminaire 112 may comprise a system that includes a single luminaire or multiple luminaires connected with a single common interface to power lines 120, 124. According to some embodiments, a power meter 114 may be connected electrically between the gateway 102 and the luminaire 112 and may be connected electrically to the luminaire 112 via the power lines 120, 124. The power meter 114 may be connected to the gateway 102 via the power meter interface 132.

The power meter 114 may be connected to an input line of the luminaire 112, in such a way that the power meter 114 measures electrical power drawn by the luminaire 112 at any given moment in real time. According to some embodiments, the power meter 114 may be connected to the gateway 102 to provide real time power measurements correlated 1-1 to luminaire 112 power drawn at any given moment. The interface 132 between the gateway 102 and the power meter 114 may be a Universal Asynchronous Receiver/Transmitter (UART) or other communication interface ("power meter interface"). The interface 120, 124 between the power meter device 114 and the luminaire 112 may depend on the type of power meter 114 being used. The power meter 114 and power meter interface 132 may be any known power meter 114 and power meter interface 132 consistent with this disclosure.

As illustrated in FIG. 1, the at least one sensor subsystem 108 may detect information related to the system 100 and the luminaires 112 by detecting current conditions of at least one of the luminaires 112. The current conditions of the luminaires 112 may be detected such as, but not limited to, a current color level or color/light intensity, the current temperature or voltage or humidity of the like, the current dimming level, and the like. The current condition information may be relayed to the gateway 102, which relays the information to the server 106 for storage, processing and the like. Thus, the sensor subsystem 108 may sense/detect a plurality of color channels and monitor at least one change in environment in real time. The up looking color sensor of the sensor subsystem 108 may identify an increase of fluctuation in the luminaire driver and/or LED driver or flickering. When the luminaire driver and/or LED driver fluctuates, the up looking color sensor may measure a change or disruption associated with the power supply or based on the power source. The information collected by the gateway 102 may include a current power level of the luminaires 112 as measured by the power meter 114 which may measure a current power level being used by the luminaires 112. The gateway 102 may be configured to receive information related to the luminaires 112 where the information includes, e.g., the color content, color/light intensity, and at least one environmental condition sensed by the sensor subsystem 108. The sensor subsystem 108 may be arranged such that it connects via connection 130 to the luminaire 112 on one side and to the gateway 102 via a sensor interface 128 on another side. According to some embodiments, the connection 130 to the luminaire 112 may comprise a physical connection and may not be limited to a specific location. The location of the sensor subsystem 108 may be different for various types of sensors that are to be positioned.

The gateway 102 may be capable of communicating and handling the plurality of sensors and sensor protocols via its sensor interface 128. Exemplary embodiments in accordance with the present disclosure do not limit the type of hardware/wire/bus interfaces between the gateway 102 and the sensor subsystem 108, e.g., the number of wires, the type of wires or bus connectors. In some embodiments, the connections may be as simple as analog interface connectors and/or electrical/digital bus connectors of any kind. In the same or other embodiments, the interfaces/connections may be wireless according to any wireless protocol consistent with this disclosure.

The sensor or combination of sensors may measure multiple color channels ("color sensor") by directly facing the luminaires, and may also include one or more low-resolution imaging/image sensors which may include an array of sensors combined into a low-resolution imaging device, or a single Application-Specific Integrated Circuit (ASIC) that is an imaging sensor ("environment sensor"). As used herein, a low-resolution image sensor refers to a sensor that typically contains less than approximately 1200 pixels, for example, and without limitation, a 32×32 sensor. For example, and without limitation, the sensor may be capable of detecting and determining how many human individuals or other objects are in an environment in which the sensor is installed and the position and orientation of each individual/object. However, the sensor may not have enough resolution to identify or distinguish the individuals/objects, especially at certain distances from the individuals/objects. The color sensor and environment sensor may be separate devices or may be combined as a single ASIC. The color sensor may be used to measure, for example and without limitation, the color content and color/light intensity of a light source. The color sensor can be based on a single color or a plurality of colors.

According to certain exemplary disclosed embodiments, the environment sensor may be used for monitoring the information to be collected about the environment in which the light source is installed. The environment sensor may include three or more different sensors such as a low-resolution image sensor, an ambient light sensor, and a temperature sensor. In the same or other embodiments in accordance with the present disclosure, the environment sensor can use other sensors and more types of sensors to characterize the environment. Without limitation, this disclosure is referring to one or more sensors included in the environment sensor as an "environment sensor". Further, without limitation, the environment sensor may include less or more sensors than are described herein. The environment sensor provided as a part of the combination of sensors may include sufficient/enough information to measure the environment, as described in this disclosure.

According to some embodiments, the combination of the environment sensor and the color sensor may be set into one of a single ASIC or a set of separate devices, all of which are also connected to the gateway 102. The sensors may be directed as follows: the color sensor is an up looking sensor that faces the luminaire 112 directly, and the environment sensor is configured to faces away or in a downward direction from the luminaire in such a way that it monitors the environment. Real time measurements and assessments may be conveyed to the gateway 102 by the sensors that make up the sensor subsystem 108.

According to some embodiments, the environment and color sensors of the sensor subsystem 108 may be placed or connected to a fitting of the luminaire 112 and/or LED 111. An exact location of the sensors may not be fixed (e.g., two different luminaires by a same manufacturer of the same type of fitting and LED specifications may be assembled such that the sensor location is different relative to the surface and dimensions of the fitting). Thus, the location of the color and environment sensors on the fitting may not be limited.

According to some embodiments, the gateway 102 may control the dimming control 110 and change at least one of a dimming level, a dimming protocol, and a color temperature of the luminaire 112, in luminaire devices that allow for color temperature control. In certain exemplary disclosed embodiments, the gateway 102 may receive a set of directives or instructions for dimming setup and sensor measurements to occur at a specific day and time and/or on a specific schedule that repeats itself. According to some embodiments, the sensors of the sensor subsystem 108 may be programmed via the gateway 102 such that they will provide data only in cases where a parameter such as, e.g., color intensity is outside a predefined range. The gateway 102 may be controlled such that it executes measurements only when environment measurements are in a certain range, as well as when the dimming level is in a certain range. According to an aspect, the dimming parameters, the environmental reading parameters, and the sensor parameters and reading setup may all be controlled from outside of the gateway 102 via cloud servers 106 that are in data communication with the gateway 102 via backhaul interface 118, described below. The control described with respect to the exemplary embodiments may allow the system to set up a miniature-controlled environment in which, for example and without limitation, at least one of the color content and color/light intensity of the luminaire 112 can be measured.

The system 100 may continuously receive real-time performance measurements from the sensor devices of the sensor subsystem 108 via the sensor interface 128 and power measurements from the power meter 114 via the power meter interface 132. According to certain exemplary embodiments, the gateway 102 sends these readings in a compressed format to the cloud servers 106. According to an aspect, the gateway 102 is configured to relay the information collected by the system to the at least one server 106 for processing, storage, calculating, compilation, comparing, and the like. In the exemplary disclosed embodiment shown in FIG. 1, the server 106 includes a processor configured to receive and use information from the gateway 102 to calculate and predict a life expectancy of the luminaires 112 and/or LEDs 111 and to generate and relay a life expectancy report to a user. The compressed format may include two types of messages, namely a baseline message set and an updates message set. In general, a message set may comprise any one of the baseline message and/or set of messages and the updates message set. According to an aspect, the baseline message set may include the full sensor readings, power level readings and current dimming state. According to another aspect, the updates message set may include changes or differentiations from a previous message set. The baseline message set may be sent upon major change, such as a change in the dimming level, while the updates message set may be sent at regular intervals. In some embodiments, the updates message set includes readings that are significantly different from a previous set. In some embodiments, sensor readings may be averaged over the time interval between two consequent updates message sets.

The system 100 may include the backhaul interface 118 for connecting the gateway 102 and a network gateway 104. In some embodiments, the backhaul interface 118 comprises a mesh network. In some embodiments, the backhaul interface 118 may comprise a wired or wireless Local Area Network (LAN), including one or more of Mesh Bluetooth Low Energy (Mesh BLE), Smart Mesh, Bluetooth Mesh, WLAN, ZigBee, and/or Ethernet LAN. The backhaul interface 118 may communicate via a communication protocol such as, but not limited to, a Mesh BLE protocol. The gateway 102 may be connected to the back-end network 104 via LAN, WLAN, WAN, Mesh BLE radio network or other means. This connection may allow another device on the network, local to the gateway or via WAN in the cloud, to handle the lumen prediction process. Thus, an entire luminaire half-life prediction process may be distributed between physical machines or on a single machine, local or remote to the gateway 102.

Exemplary disclosed embodiments in accordance with the present disclosure provide the system 100 that includes the gateway 102, which can interface with other control systems or devices via wired connections, Ethernet connections, wireless connections or any combination thereof, and can receive control messages that direct the gateway 102 to change at least one of a dimming level and a dimming control protocol via its dimming interface/control/driver 110. This interface or plurality of interfaces comprise the backhaul interface 118 of the gateway. In certain exemplary embodiments, the backhaul protocol is associated with a mesh network and is capable of delivering dimming directions to the gateway 102 as well as receiving sensor and power level readings via the sensor subsystem 108 and power meter 114 from the gateway 102 associated with the luminaires 112 managed by the gateway 102.

In the exemplary embodiment shown in FIG. 1, the gateway 102 may be connected to the network gateway 104, which may reside between the local networks and a wide area network (WAN) 116. In some embodiments, the WAN 116 may connect the gateway 102 to cloud servers 106 for operational and management interfaces. According to some embodiments, the gateway 102 may be configured to control a plurality of dimming levels of the luminaire 112 and is capable of communicating sensor readings and the dimming level as well as a power reading of the luminaire 112 over the wired/wireless network(s) 118 and via the Wide Area Network ("WAN") 116 to the server 106 for processing.

In an aspect, the cloud servers 106 may be continuously receiving performance measurements from one or more gateways 102. In another aspect, the cloud servers 106 provide each gateway 102 with a table of reading directions that include the correct sensor reading thresholds for specific dimming levels associated with the specific luminaire 112. Thus, the gateway 102 may only need to report changes or deviations from this internal table to the cloud servers 106. Using this method, the system 100 may further reduce an amount of information that needs to be transmitted over the gateway 102 to backhaul interface 118. In this way, the cloud server applications may control the rate of information sent by the gateway 102 and more accurately predict the LED 111 behavior.

The system 100 may send sensor readings and other information over the backhaul interface 118 to the cloud server 106 at random times. This may allow for better utilization of the backhaul interface 118. In some embodiments, messages being sent at random time periods during the day may include a correct time stamp of the measurement or reading and the sensor reading (e.g., dimming level). Because of a delay in transmission, the message receiving time at the cloud server 106 may not correlate with the actual time that the measurement was taken. Thus, in an aspect, the measurement is tagged with a time of measurement. In general, the use of a mesh network as the backhaul interface 118 and the likely numerous gateways 102, luminaires 112, and sensors per gateway 102 may provide an opportunity to implement an interference mitigating protocol to ensure more timely and successful message and data packet delivery for managing the luminaire IoT system.

Figure 3:
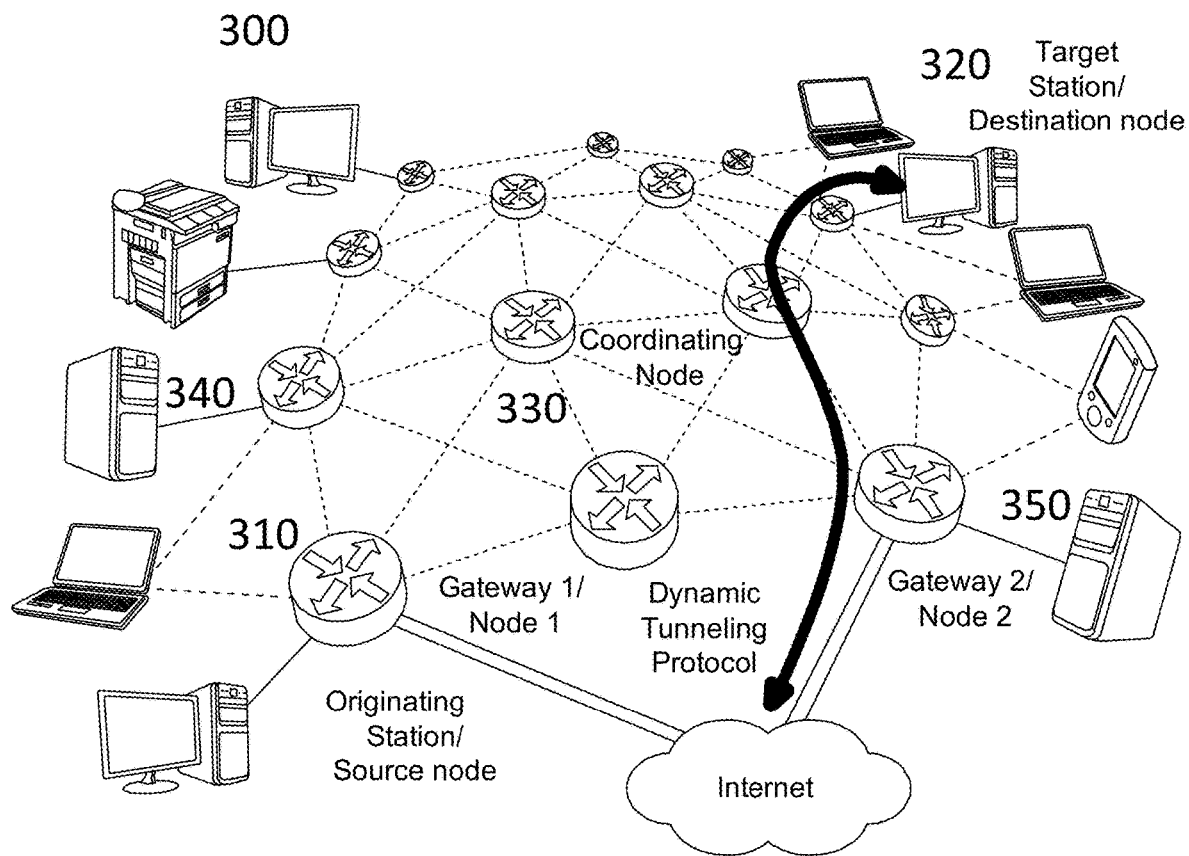
FIG. 3 illustrates a high-level system diagram of a mesh network, using the interference mitigating protocol according to some embodiments.

FIG. 3 is a high-level system diagram of a mesh network 300 implemented in any wired or wireless network system, according to certain exemplary disclosed embodiments. The exemplary disclosed embodiments may relate to a system for managing a dynamic tunneling protocol in a mesh network and determining a best path through the mesh network for implementing the dynamic tunneling protocol. In some embodiments, the mesh network 300 comprises at least one network server 340 connected with a gateway 350 and at least one tunnelling network routing protocol. In some embodiments, the system may be configured to determine a specific or best path to transmit data packets via a tunnelling network protocol from an originator station 310 to a target station 320. The system may be further configured to identify and collect path information from all nodes in a mesh network 300 during normal operation of the mesh network 300. For example, the path information that is collected may include a rate that data packets are received in an ordered sequence based on measuring one or more, or combination of factors such as, time of arrival of the data packets, time of origination of the data packets, and/or a distance of the path from the originator station 310 to the target station 320. In some embodiments, the system may be configured to identify one or more high density data packets originated from the originator stations 310. In some embodiments, the collection of information, such as, a time of arrival while collecting path information for messages from every node during normal operation of the mesh network 300. The collected information may also include a time of origination and may measure a time of arrival and measure the path. The mesh network 300 may be further configured to assign and/or store the specific or best path via one or more nodes for transmission of the one or more high density data packets from the originator station 310 to the target station 320 based on the collected path information. The best path information may be stored at a coordinating node 330 that may not only store information about best paths through the mesh network 300 but may also send a start message to initiate a dynamic tunneling protocol and may send a close message to stop the dynamic tunneling protocol and to restart normal operation of the mesh network 300.

In some embodiments, such as illustrated in FIG. 3, a best path may include exiting and reentering the mesh network 300 via the internet.

Figure 4:
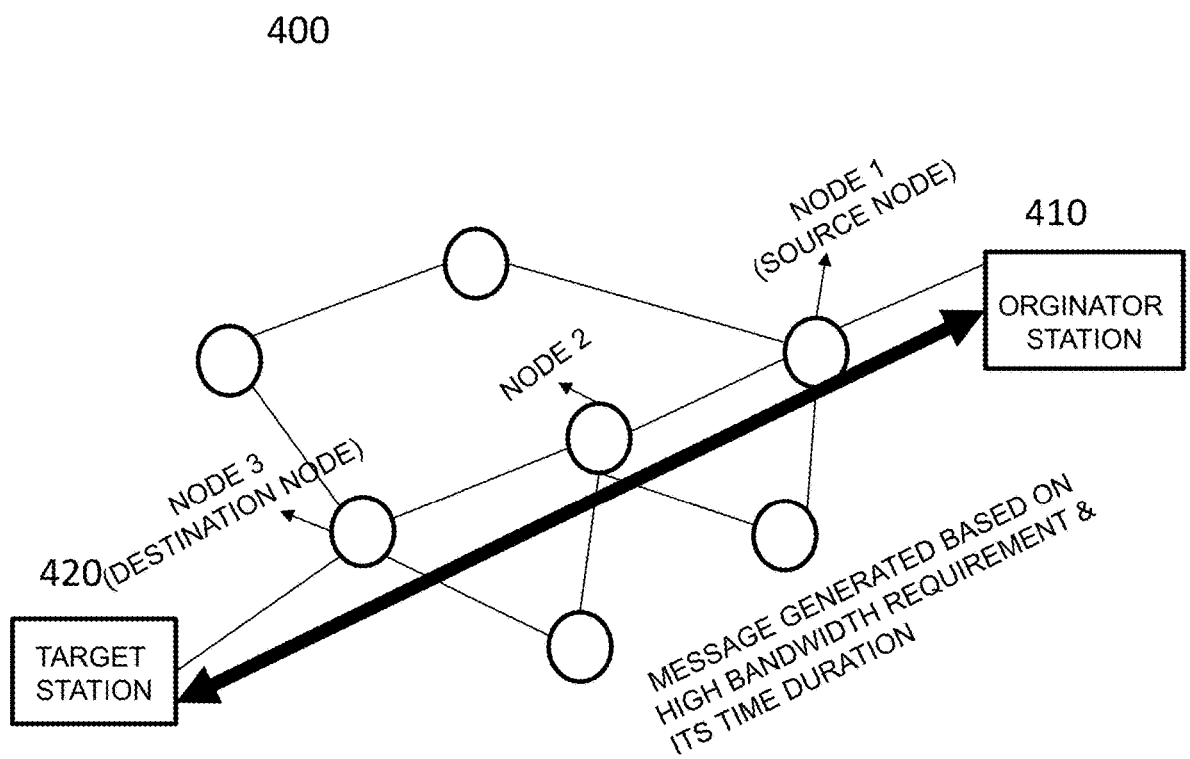
FIG. 4 is a diagram that illustrates an embodiment of a best path determination for transferring data packets between an originator station and a target station in the mesh network.

The mesh network 300 may be configured to manage multiple applications and profiles for implementing a dynamic tunneling operation in the mesh network 300. With reference now to FIG. 4, an exemplary diagram of assigned nodes for transferring data packets between an originator station 410 (e.g., data associated with a high bandwidth application) to a target station 420 in a mesh network 400 is shown.

In some embodiments, multiple applications may be used to manage dynamic tunneling operations. To manage dynamic tunneling operations, a management module (e.g., such as coordinating node 330 of FIG. 3) may provide an interface to set up identification for one or more high bandwidth applications and to associate them with a specific node (e.g., a node location within the mesh network). In some embodiments, an automatic discovery mechanism may automatically discover the application and a node that the application is associated with (e.g., where the application is installed or a node that the application communicates through). For example, in a case that a high definition camera is connected to the mesh network, this system may identify this device as being associated with a high bandwidth application that transmits high density packets (e.g., high definition video).

In some embodiments, the high bandwidth application may utilize a trigger that indicates to the mesh network that the application needs more bandwidth. In some embodiments, the trigger may be implemented by transmitting a message that the application needs more bandwidth where the message may further indicate a duration (e.g., how long the application will require more bandwidth). The message may be received at a node (e.g. a coordinating node) and the node may initiate dynamic tunneling operations. For example, the node may send a tunneling start message with a timeout to all of the nodes in the mesh network. The tunneling start message may include a best path for data to be transmitted.

The tunneling start message, also called a setup message, may be sent from a coordinating node or, in some embodiments, the tunneling start message may be transmitted directly from an originator station or an application residing on one or more nodes that is in need of high bandwidth. In some embodiments, the tunneling start message may be received at the nodes assigned to the best path thereby allowing tunneling to start and for messages to be transmitted along the best path at a higher bandwidth. The system may terminate the dynamic tunneling protocol based on a tunneling close message once the high density data packets have reached their destination (e.g., a target node or gateway). In some embodiments, the tunneling start message may be received at nodes that are not associated with the best path and in response to receiving the tunneling start message, the nodes that are not associated with the best path may remain silent and may not transmit or forward messages. Messages received at the nodes that are not associated with the best path may be stored in a cache for later transmission or may simply be dropped.

Figure 5:
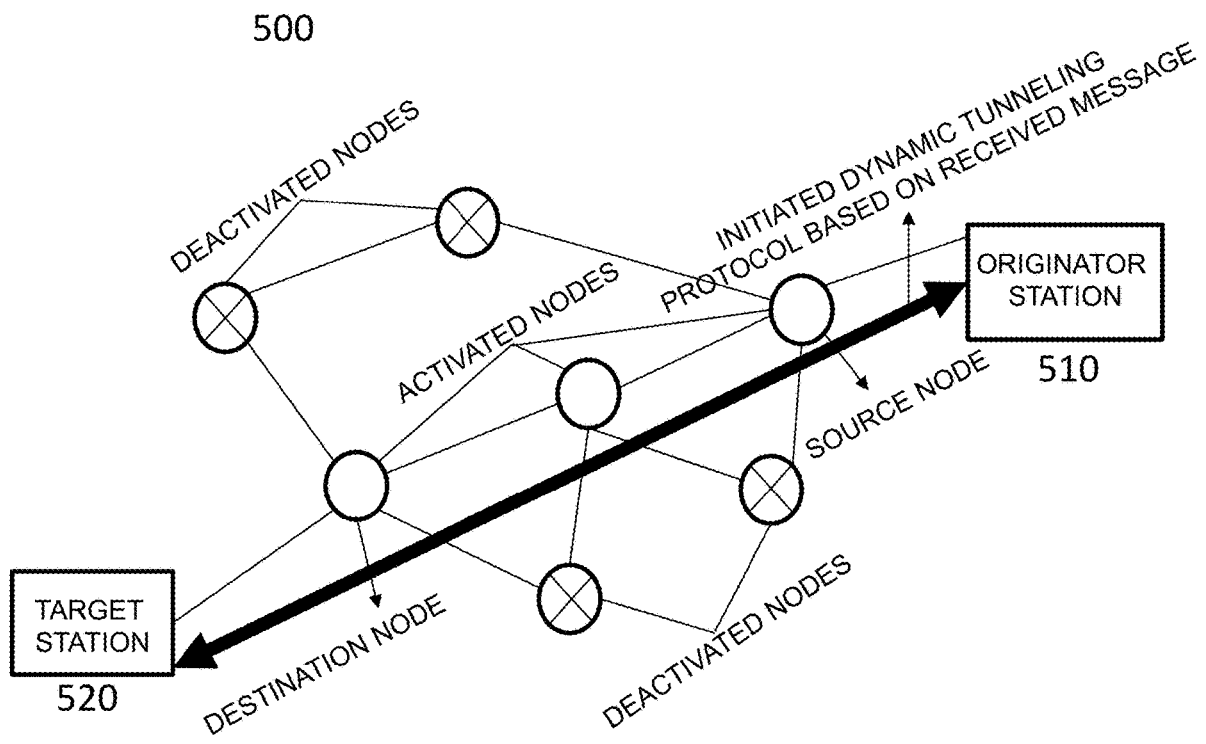
FIG. 5 is a diagram that illustrates an embodiment of an initiated interference mitigating for transferring data packets between an originator station to a target station in a mesh network.
Figure 6:
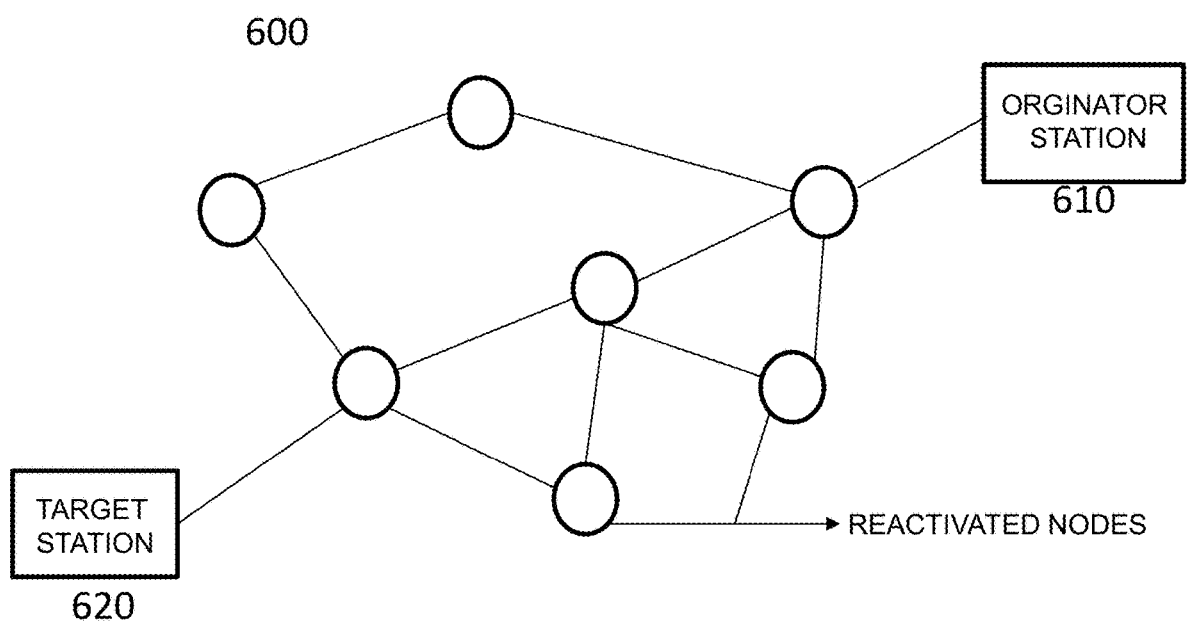
FIG. 6 is a diagram showing re-activated nodes after transferring data packets between an originator station to a target station in the mesh network, according to an embodiment.

FIG. 5 illustrates an exemplary diagram associated with an initiated dynamic tunneling protocol via a message generated for transferring data packets from an originator station 510 to a target station 520 in the mesh network 500. In some embodiments, the generated message may be configured to activate the specific nodes in the best path and to inactivate the nodes other than the specific nodes until the high density data packets have been received by the target station 520. FIG. 6 illustrates an exemplary diagram associated with re-activated nodes after transferring data packets from an originator station 610 to a target station 620 in the mesh network 600. In some embodiments, the system may be further configured to re-activate all the nodes in the mesh network 600 once the high density data packets have been received by the target station 620. Further, the system may maintain pre-determined best paths via specific nodes to receive the high density data packets at all times from one or more originator station 610 to one or more target station 620.

The exemplary mesh network 600 shown in FIG. 6 may include, but is not limited to, a wired or wireless mesh network, a set of wired switches, a wireless mesh, or any light (e.g., VLC/DLC) communication network. In some embodiments, the dynamic tunneling protocol may be initiated after determining the best path through the mesh network 600. However, in some embodiments, the dynamic tunneling protocol may be initiated in conjunction with determining the best path through the mesh network 600 and the best path may be dynamically determined. To determine the best path, the system may be configured to identify and collect path information from all nodes during normal operation of the mesh network 600. For example, the system may collect data rates associated with an ordered sequence of data packets that have been received by measuring one or more factors associated with the data packets. In some embodiments, the factors may include information such as, but not limited to, times of arrival of the data packets, time of origination of the data packets, and the distance of the path from the originator station to the target station. The system may be configured to assign the best path for transmitting high density bandwidth information based on the collected path information. In some embodiments, the system further constantly measures times of arrival associated with data packets during transmission of high density data packets so that the best path may be dynamically changed during transmission of the packets when a slowdown associated with a specific node is determined. In a case of a slowdown, the system may generate a second setup message that indicates an alternate path (e.g., an alternate best path) The nodes may include, but are not limited to, any gateway, router, or originator/application that transmits high density memory data packets such as images, video streaming, or HD videos, etc.

In some embodiments, the system may be configured to generate a setup message across the nodes in the mesh network to enable the best path for transferring high density data packets using a dynamic tunneling protocol. The setup message may include a forwarding identification (ID) of a set of specific nodes using normal protocol interfaces to transfer data packets/high density data packets. In some embodiments, the setup message may include a hop by hop ID to transfer the data packets between the specific nodes (e.g. instruction to send the message from node A to node B and then to node C). The system may optionally be configured to transmit a separate control message to pause all activity which is particularly applicable for wireless and/or light-based mesh network systems. In some embodiments, the best path of the message, that is indicated in a header of the data packets, may be truncated after every hop in the implemented mesh network. For example, after being sent from node A to node B, the header may be truncated to remove node B prior to the message being sent to node C.

In some embodiments, when the setup message reaches the node associated with the high bandwidth application, the sending of messages is initiated at a high bandwidth where the data packets will be forwarded via the nodes associated with the best path. In one embodiment, the system is further configured to re-activate all the nodes in the mesh network after the high density data packets are received by the target station. Further, the system may maintain pre-determined best paths via specific nodes to receive the high density data packets at all times from one or more originator station to one or more target station. In some embodiments, except from the identified nodes associated with the best path, the remaining nodes of the mesh network may stop sending or forwarding messages after an allowed time with some delta constant.

Figure 7B:
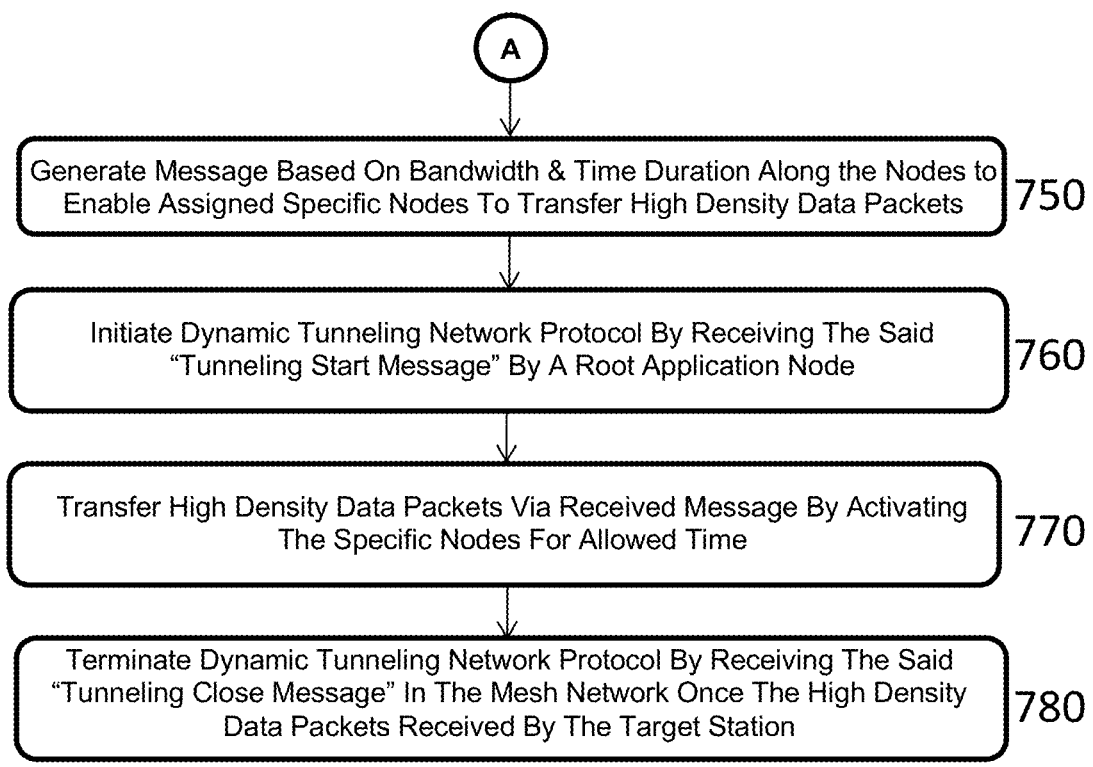

FIGS. 7A and 7B show an exemplary method 700 for managing and controlling a dynamic tunneling protocol associated with network hardware devices in a mesh network. At 710, the multiple applications and their associated profiles for managing dynamic tunneling operation may be managed in a mesh network. At 720, an interface may be provided to identify an application (and a location of the application) in the mesh network. The interface may provide a means for a user to enter in information associated with an application (e.g. a name, an executable file, etc.) and a node (or nodes) associated with the application to register the application with a coordinating node or controller. At 730, the system may also allow for automatic discovery of the application based on, for example, an application name, a file type or an identification of a type of device installed at the node (e.g., a high definition camera). The system may then associate the discovered application with a node or nodes (e.g., a node connected to the application). Each application entered (or discovered) may use an auto-trigger that is driven by the application in a case that the application requires more bandwidth at 740. In a case that the application requires more bandwidth, the application, at 750, may generate and transmit a message to indicate that the application is in need of higher bandwidth and a time duration for this requirement. This trigger message may initiate a tunneling start message that includes a timeout to the nodes associated with the best path at 760. In some embodiments, the trigger message may be transmitted across the mesh network to initiate a dynamic tunneling protocol. In some embodiments, the trigger message may be received at a coordinating node and in response to receiving the trigger, the coordinating node may initiate a tunneling start message to enable the dynamic tunneling protocol.

The tunneling start message transmitted across the nodes may enable the best path by using a specific set of nodes that may include a forwarding ID (hop by hop route ID) of the specific set of nodes in a header of the tunneling start message. In some embodiments, the tunneling start message may be truncated after every hop. For example, the hop by hop route ID is changed to remove each node from the hop to hop route ID after that node received the message. In some embodiments, identifying or determining the best path to implement the dynamic tunneling protocol in the mesh network may be based on historic and/or current data associated with actual use of the mesh network or combinations thereof. In some embodiments, each path between the originator and the destination may be analyzed using current data (e.g., data rates, times, a number of collisions, etc.) as well as historic data associated with each node and link between nodes (e.g., known periodic outages associated with specific nodes, times of day when data rates associated with specific nodes may be slower due to external interference). The current and historic data may be collected during normal (e.g., actual) operation of the mesh network and may include, but is not limited to, times of arrival of data packets, times of origination of the data packets, data rates, and distances along one or more paths between an originator station and a target station. The current and historical data may be stored at a coordinating node. In some embodiments, the system may automatically indicate specific nodes as being associated with a high bandwidth application. For example, a node that is indicated as comprising a high-resolution camera may automatically be indicated as having a high bandwidth application. The high-density data packets may be received via the specific nodes at 770. After the high-density packets have been transmitted, the system may send a close message to stop the dynamic tunneling protocol at 780. In response to the close message, the nodes of the mesh network may revert to their normal operation.

In one embodiment, the system and method further comprises a transmission means for changing the transmission of data packets along a different path and/or at a different time based on the current and historical data associated with a current path such that the data packets are received in the ordered sequence at the target station in the mesh network. In some embodiments, the system further comprises storage means for storing the current (e.g. real time or near real time) and historical data in a data storage (e.g. a database, a table, etc.). In one embodiment, the system further comprises a calculation means (e.g. a processor) for determining factors such as, but not limited to, the time of arrival, time of origination of the data packets along a plurality of different paths between the originating station and the target station in the mesh network. In some embodiments, the system further comprises calculation means (e.g., the processor) for measuring a time of transmission of data packets along a plurality of different paths in an ordered sequence between the originating station and the target station in the mesh network. In some embodiments, the system further comprises selecting means (e.g., the processor) for selecting a best path through the mesh network for transferring one or more high density data packets between the originating station and the target station.

In some embodiments, the system comprises plurality of nodes wherein at least one of the plurality of nodes comprises a coordinating node that is used to activate specific path/route information to other nodes on request. Further, in some embodiments, the system comprising plurality of nodes may use the coordinating node to deactivate a best path and/or its associated information on request.

In some embodiments, the system may be configured to reduce a number of hops through the mesh network by initiating the dynamic tunnelling network protocol along the specified best path. In some embodiments, the specified best path may be associated with more than one source nodes and/or more than one destination node in the mesh network. The specified best path may be assigned by a coordinating node, one or more targeting stations in the mesh network or by one or more originating stations in the mesh network.

The best path may be selected with consideration to the information on the distances between the originating station and the target station in the mesh network. In another embodiment, each path through the mesh network may be selected with consideration to the information on the number of nodes between the originating station and the target station in the mesh network. In some embodiments, the mesh network comprises a coordinator node, wherein the coordinator node is configured to store the path information on the distances between the originating station and the target station in the mesh network. In some embodiments, the coordinator node may be configured to store the route information associated with the number of nodes between the originating station and the target station in the mesh network. In some embodiments, the stored path/route information may change in response to messages generated by the coordinator node.

In some embodiments, the originating station may not be the coordinator node and the originating station may request path information to a target station nodes via one or more coordinator nodes. As such, the coordinator nodes may send path information to the originating station. In some embodiments the coordinator node may send best path information after initiating a dynamic tunnelling protocol to receive high density data and the coordinator node may comprise any one of assigned nodes during deployment of mesh network. In various embodiments, the coordinator node may comprise one or more gateways, one or more routers, or any of the network hardware devices.

In some embodiments, the originating station/source node may not be the coordinator node, the originating station/source nodes may request path/route information from a target station/destination nodes via one or more coordinator nodes. Thereby, the coordinator nodes may send path information to the originating station/source nodes. In some embodiments, the coordinator node may send specific path information via initiating a dynamic interference mitigating protocol to receive high density data packets from applications such as video/image data to the originating station/source nodes. In some embodiments, the coordinator node may comprise any one of assigned nodes during deployment of the mesh network. In some embodiments, the coordinator node may comprise one or more gateways, one or more routers, or any of the network hardware devices.

The coordinating node may comprise a processor, such as one or more commercially available Central Processing Units (CPUs) in the form of one-chip microprocessors, coupled to a communication device configured to communicate via a communication network. The processor may communicate with a memory/storage device that stores data. The storage device may comprise any appropriate information storage device, including combinations of magnetic storage devices (e.g., a hard disk drive), optical storage devices, and/or semiconductor memory devices. The storage device may store a program and/or processing logic for controlling the processor. The processor performs instructions of the programs and thereby operates in accordance with any of the embodiments described herein. The programs may be stored in a compiled, compressed, uncompiled and/or encrypted format or a combination. The programs may furthermore include other program elements, such as an operating system, a database management system, and/or device drivers used by the processor to interface with peripheral devices.

The present disclosure, in various embodiments, configurations and aspects, include components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, include providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower", etc. are used to identify one element from another, and unless otherwise specified are not meant to refer to a particular order or number of elements.

As used in the claims, the word "comprises" and its grammatical variants, such as "including", and "having" logically also subtend and include phrases of varying and differing extent such as for example, but not limited thereto, "consisting essentially of" and "consisting of." Where necessary, ranges have been supplied, and those ranges are inclusive of all sub-ranges there between. It is to be expected that variations in these ranges will suggest themselves to a practitioner having ordinary skill in the art and, where not already dedicated to the public, the appended claims should cover those variations.

The terms "determine", "calculate" and "compute," and variations thereof, as used herein, are used interchangeably and include any type of methodology, process, mathematical operation or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, exemplary aspects lie in less than all features of a single foregoing disclosed embodiment, configuration, or aspect. Thus, the following claims are hereby incorporated into this Detailed Description, with each claim standing on its own as a separate exemplary embodiment of the present disclosure.

Moreover, the description of the present disclosure has included descriptions of one or more embodiments, configurations, or aspects, and certain variations and modifications, other variations, combinations, and modifications that are within the scope of the present disclosure, as may be within the skill and knowledge of those in the art, after understanding the present disclosure. Furthermore, it is intended to obtain rights which include alternative embodiments, configurations, or aspects, to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for managing dynamic tunneling in a mesh network, the system comprising:
   a first of a plurality of nodes in a mesh network to function as an originator station, where the first of the plurality of nodes is associated with an application that transmits high-density data packets;
   a second of the plurality of nodes in the mesh network to function as a target station and to receive the high-density data packets from the application; and
   a third of the plurality of nodes in the mesh network to function as a coordinating node and to generate at least one of a first message or a second message, via a processor, across the plurality of nodes to activate a best path through the mesh network when the application requires more bandwidth,
      wherein the first message indicates a time duration that the application will require more bandwidth and each node of the plurality of nodes that is not associated with the best path through the mesh network will stop transmitting during the time duration that the application will require more bandwidth,
      wherein in a case that the current data indicates that an alternate path would be faster than the best path, the coordinating node generates a second message across the plurality of nodes to activate the alternate path through the mesh network,
wherein the second message activates an alternate path through the mesh network in response to an indication that the alternate path would be faster than the best path,
wherein the best path is based on one or both of historic data associated with actual use of the mesh network and current data associated with actual use of the mesh network, and
wherein the one or both of the historic data associated with actual use of the mesh network and the current data associated with actual use of the mesh network comprises a combination of data rates, numbers of collisions, times of arrival of data packets, times of origination of data packets, or distances of paths from the originator station to the target station.

2. The system of claim 1, wherein the coordinating node functions to associate the application with the originator station and create an auto-trigger for the application to initiate when the application requires more bandwidth, and the first message is generated in response to the auto-trigger being activated.

3. The system of claim 2, wherein the best path includes exiting and reentering the mesh network via the internet.

4. The system of claim 2, wherein associating the application with the originator station is based on at least one of an automatic discovery process and a registration process through an interface.

5. The system of claim 1, wherein the nodes that are not associated with the best path will resume transmitting after the time duration that the application will require more bandwidth.

6. The system of claim 1, wherein the generated first message and the generated second message are transmitted via the coordinating node.

7. The system of claim 1, wherein the generated first message and the generated second message include a list of forwarding nodes in the mesh network.

8. The system of claim 1, where the one or both of historic data associated with actual use of the mesh network and current data associated with actual use of the mesh network is collected during normal operation of the mesh network.

9. A method for managing dynamic tunneling in a mesh network, the method comprising:
associating an application that transmits high density data packets with a first of a plurality of nodes in a mesh network that functions as an originator station for transmitting the high density data packets to a second of the plurality of nodes in the mesh network that functions as a target station;
creating an auto-trigger to be initiated by the application in a case that the application requires more bandwidth;
generating a first message, via a processor, across the plurality of nodes to activate a best path through the mesh network in response to the auto-trigger being activated, wherein the first message indicates a time duration that the application will require more bandwidth;
generating a second message, via a processor, across the plurality of nodes to activate an alternate path through the mesh network in response to an indication that the alternate path would be faster than the best path;
stopping each node of the plurality of nodes that is not associated with at least one of the best path or the alternate path through the mesh network from transmitting during the time duration that the application will require more bandwidth; and
generating, after the time duration that the application will require more bandwidth, a third message, via the processor, across the plurality of nodes to deactivate at least one of the best path or the alternate path through the mesh network.

10. The method of claim 9, wherein the associating an application that transmits high density data packets step is based on an automatic discovery process or a registration process through an interface.

11. The method of claim 10, further comprising re-activating each node of the plurality of nodes that is not associated with the best path through the mesh network for which transmitting was stopped, after the time duration that the application will require more bandwidth.

12. The method of claim 9, wherein a header of the first message and includes a hop by hop route of the specific set of nodes associated with the best path, and the hop by hop route is truncated after every hop.

13. A non-transitory computer readable medium, comprising computer executable steps that, when executed by a processor, perform a method for managing dynamic tunneling in a mesh network, the method comprising:
associating an application that transmits high density data packets with a first of a plurality of nodes in a mesh network that functions as an originator station for transmitting the high density data packets to a second of the plurality of nodes in the mesh network that functions as a target station;
creating an auto-trigger to be initiated by the application in a case that the application requires more bandwidth;
generating a first message, via a processor, across the plurality of nodes to activate a best path through the mesh network in response to the auto-trigger being activated,
wherein the first message indicates a time duration that the application will require more bandwidth,
wherein the best path is based on one or both of historic data associated with actual use of the mesh network and current data associated with actual use of the mesh network;
generating a second message via a processor, via a processor, across the plurality of nodes to activate an alternate path through the mesh network in response to an indication that the alternate path would be faster than the best path; and
stopping each node of the plurality of nodes that is not associated with at least one of the best path or the alternate path through the mesh network from transmitting during the time duration that the application will require more bandwidth.

14. The medium of claim 13, wherein the wherein the associating an application that transmits high density data packets step is based on an automatic discovery process or a registration process through an interface.

15. The medium of claim 13, further comprising: re-activating each node of the plurality of nodes that is not associated with the best path through the mesh network for which transmitting was stopped, after the time duration that the application will require more bandwidth.

16. The system of claim 1, wherein the best path is maintained after the time duration that the application will require more bandwidth, via specific nodes, to transmit the high-density data packets at all time.

* * * * *